R. E. McKEE.
CIRCUIT CLOSER.
APPLICATION FILED NOV. 15, 1915.
1,324,915.
Patented Dec. 16, 1919
2 SHEETS—SHEET 2.
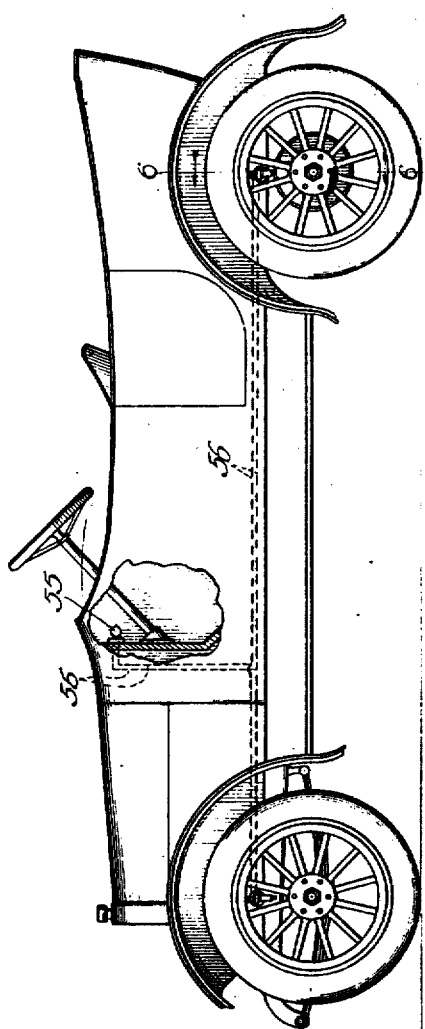
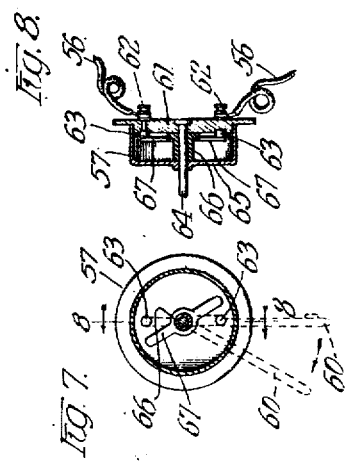
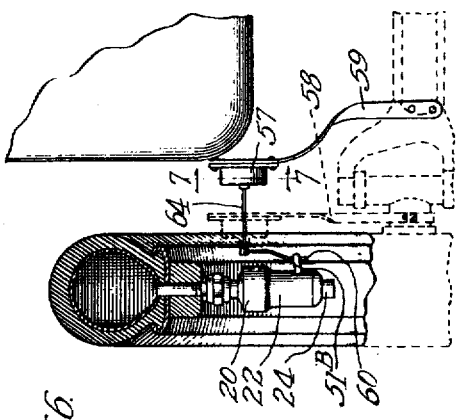
Witnesses:
Robert H. Weir
Arthur W. Carlow
Inventor
Raymond E. McKee
By Frank Schraeder
Atty.

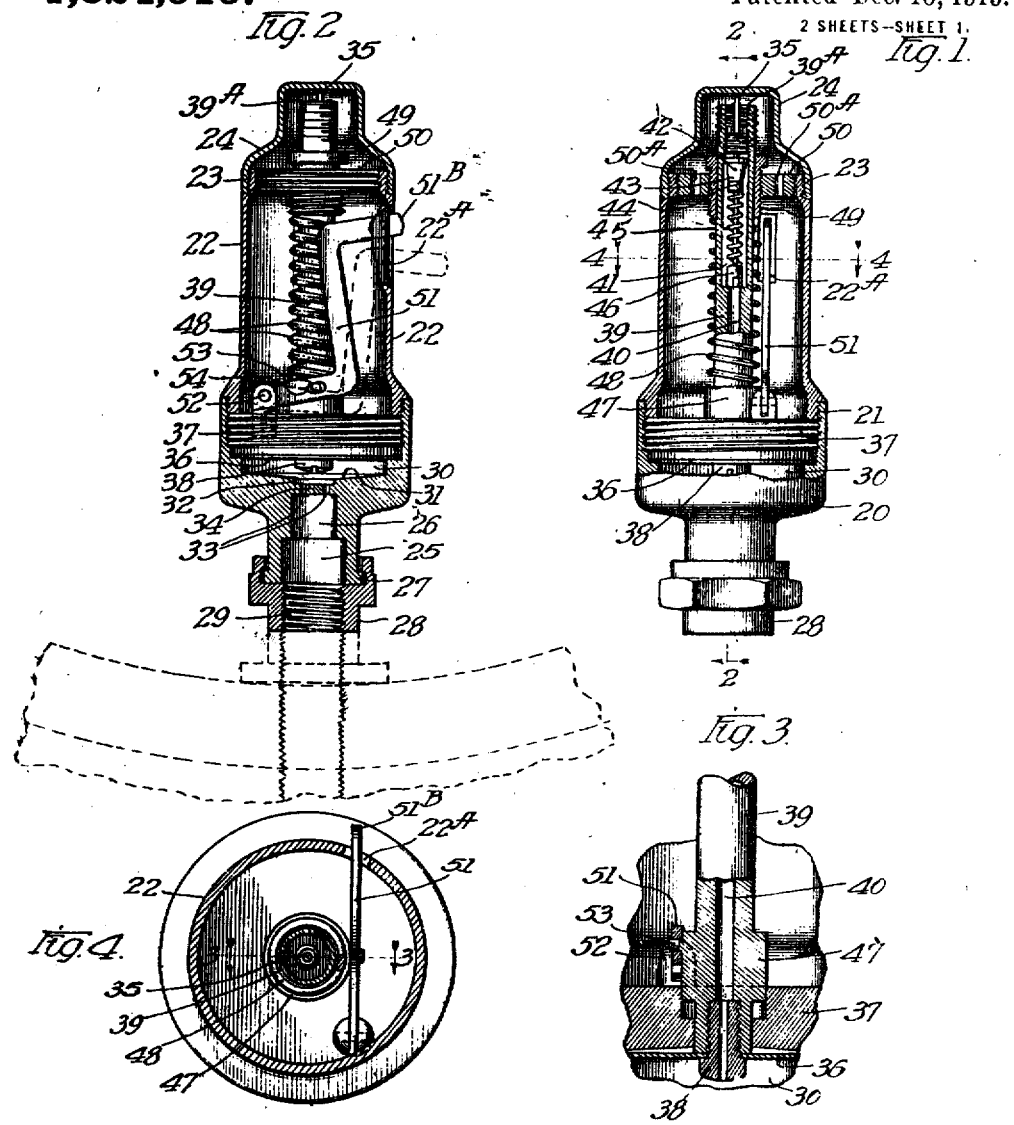

UNITED STATES PATENT OFFICE.

RAYMOND E. McKEE, OF CHICAGO, ILLINOIS, ASSIGNOR OF ONE-HALF TO OSCAR HAMMERSMITH, OF CHICAGO, ILLINOIS.

CIRCUIT-CLOSER.

1,324,915.  Specification of Letters Patent.  Patented Dec. 16, 1919.

Application filed November 15, 1915. Serial No. 61,664.

*To all whom it may concern:*

Be it known that I, RAYMOND E. McKEE, of Chicago, in the county of Cook and State of Illinois, have invented certain new and useful Improvements in Circuit-Closers, of which the following is a specification.

This invention relates to circuit closers for signals operating in connection with pneumatic tires, and has among its objects the production of a safety-valve signal arranged to warn the driver of an automobile or the like when the pressure in any one or more of the tires is lowered below a desirable minimum pressure.

Two principal causes underlie the blowing up of pneumatic tires: first, under-inflation, and second, over-inflation.

When an automobile is run with tires under-inflated the sides of the tire are subjected to a greater bending motion, which has a tendency of gradually weakening and breaking the fibers in the material and thereby producing a weakened tire which easily bursts when the air pressure is increased therein.

Also, an over-inflated tire may burst when the air in the tire is sufficiently heated to an excessive air pressure for a weakened portion in the tire.

The principal object of this invention resides in the provision of a safety-valve and signal for pneumatic tires which will automatically exhaust or relieve the pressure in the tire when the pressure has been raised above a pre-determined point, and which will also signal and warn the operator or driver of an automobile when the pressure in any tire is lowered below a certain desired low pressure; such low pressure signal including an electric light signal.

With the above and other objects in view, the invention consists in the details of construction and in the arrangement and combination of parts hereinafter described and particularly pointed out in the appended claim.

In describing the invention in detail, reference will be had to the accompanying drawings, wherein like reference characters denote corresponding parts in the several views, and in which—

Figure 1 is a part vertical section of my invention.

Fig. 2 is a cross section taken on line 2—2 of Fig. 1 showing an elevation of the interior.

Fig. 3 is an enlarged section taken on line 3—3 of Fig. 4 showing connection of diaphragm and movable tube.

Fig. 4 is an enlarged detail view taken on line 4—4 of Fig. 1 showing a cross section of an application of my invention.

Fig. 5 is an elevation of an automobile showing my low pressure electric light signal.

Fig. 6 shows the manner of operation and support for the electric switch.

Fig. 7 is an enlarged section of switch taken on line 7—7 of Fig. 6.

Fig. 8 is a cross section on line 8—8 of Fig. 7.

Referring to the drawings, my device consists of a lower body member 20 having a threaded connection 21 with a cylindrical wall member 22 which latter also has a threaded connection 23 with the cap 24. The lower body member 20 is provided with a central bore 25 which has a portion decreased in diameter as at 26 to fit over the threaded end of a standard pneumatic tire valve tube (shown dotted in Fig. 2), the construction of which is well understood in the art.

A loosely mounted nut 28, internally threaded at 29, is provided over the external collar 27 which is formed at lower part of the valve body 20. It is evident, that by the use of this construction, the entire device can be mounted in a certain fixed relative position to the electrical signal switch or gong as will be hereinafter fully explained.

Above the internal bore 26 is a diaphragm chamber 30, the floor 31 of which slopes downwardly toward the center depression 32 which depression communicates with the interior decreased bore 26 through several holes 33, which are drilled in the web 34, to admit the air from the pneumatic tire tube orifice when the usual projecting valve stem, similar to stem 35, is depressed by being brought into engagement with the underside of the web 34. Therefore, as long as my device is attached to the tire tube, there will be constant communication between the interior of the diaphragm chamber 30 and the interior of the pneumatic tire.

The diaphragm 36 made preferably of hardened brass, is securely retained by the threaded disk 37 which is dished on the lower face to allow for movement of the diaphragm.

Centrally connected with said diaphragm 36, by means of the screw 38, is a vertically movable, tubular member 39 provided with an interior bore 40 with the upper enlarged portion 41 containing the common form of check valve 42 which comprises the valve seat 43 and the valve 44 mounted on stem 35. The valve is normally closed by means of the expansion spring 45 which is confined between the valve 44 and the metal rest or shoulder 46. As is well understood, the stem 35 projects normally a little above the orifice or terminal 39ᴬ. The screw 38 is provided with a longitudinal bore to afford constant communication between the interior of the pneumatic tire and the bore 40, as clearly shown in Fig. 3.

An enlarged portion 47 located on the exterior lower part of the tubular member 39 forms a seat for a coiled spring 48, the upper end of which abuts against the adjusting thumb screw 49 which has a screwed connection within the disk 50 which disk is screw-connected within the upper part of the cylindrical member 22.

The adjusting thumb screw 49 is provided with a central bore to fit and guide the tubular member 39 in its vertical movement, and is so arranged that by turning the screw 49 in or out, the spring 48 is more or less compressed and the pressure of the valve member 39 on the diaphragm 36 is varied, thereby affording a variable point of exhaust for the valve 44.

The illustrations show the device in a condition with air pressure within the diaphragm chamber and with the stem 35 a short distance from the inside of the top of cap 24. It is obvious, that when the pressure within the tire and diaphragm chamber exceeds a certain predetermined point of safety, which is controlled by said adjusting screw 49 and spring 48, the pressure against the diaphragm 36 will continue to raise the tubular valve member 39 until the valve stem 35 engages the under side of the cap 24 and thereby displaces the valve 44 to relieve the tire of the excessive pressure and exhaust same through the openings 50ᴬ in disk 50 and out through the slot 22ᴬ in the wall 22.

The low pressure signals are operated by means of an S-shaped lever 51 having a lower fixed end pivotally mounted in the support 52 which support is screw-mounted on disk 37.

A pin 53 is secured within the portion 47 and extends through the slot 54 of the lever 51.

If the tire should for any reason leak so as to lower the pressure within, it is clear that the end 51ᴮ of lever 51 will be gradually moved outwardly through the slotted opening 22ᴬ (as shown dotted in Fig. 2) by means of the pin 53 moving the pivoted end 51ᴬ downwardly.

The electric signal comprises an ordinary electric light bulb 55 which, in the case of an automobile, may be mounted on the dash board and connected by a pair of wires 56 with each one of four switches 57 which are rigidly mounted on the strap supports 58 and 59 which are secured to, respectively, the front and rear wheel supports. The front switch support 58 (shown dotted in Fig. 6) being attached to the movable portion of the front wheel steering knuckle, so as to maintain a fixed relative position to the lateral movement of the wheel.

A complete electric circuit between the bulb 55 and each switch 57 may be made by the end 51ᴮ of lever 51 coming into engagement with the extending switch arm 60 arranged within its path at the lowering of the pressure within any one of the tires.

The construction of switch 57 includes the back 61, a pair of binding posts 62 and contact points 63. Rigidly mounted on shaft 64, one end of which is supported within the back 61 and cover 65 and the operating end of which is rigidly connected with the switch arm 60, is a sleeve 66 of insulating material, supporting a spring contact plate 67.

It will be understood then, that normally, the end 51ᴮ of lever 51 will not engage the arm 60, but when the pressure in any tire is lowered to a certain predetermined lower pressure, the movable valve tube 39 will move the lever end 51ᴮ outwardly (as shown dotted in Fig. 2) into engagement with the arm 60, thereby rotating shaft 64 and the spring contact plate 67 to complete the circuit with points 63 to light the electric bulb 55. Any suitable source of electric power, as a battery, may be provided. The spring action of plate 67 retains the plate in constant contact until the tire pressure is raised and arm 60 moved to normal position by the operator, thereby breaking the circuit.

It is thought that the illustration and foregoing description of construction and operation will be clearly understood, therefore, a more extended explanation is omitted.

I claim as my invention:

In a circuit closer of the kind described, the combination of a body, a vertically movable member, a diaphragm having its margin restrained and its central portion constantly engaging said member to raise and lower said member under the influence of air pressure beneath said diaphragm, a pivotally mounted lever, a pin on said member extending through said lever and adapted for moving a portion of said lever outwardly through said body when the pressure below said diaphragm is lowered, said lever when in said projected position being adapted to operate an electric switch.

In witness whereof, I have hereunto subscribed my name this 12th day of November, 1915.

RAYMOND E. McKEE.